(12) United States Patent
Carroll et al.

(10) Patent No.: US 11,489,834 B1
(45) Date of Patent: Nov. 1, 2022

(54) SYSTEMS AND METHODS FOR AN ENTITY TO CONTROL INFORMATION EXCHANGE

(71) Applicant: DIEM AI, LLC, Kansas City, KS (US)

(72) Inventors: Daniel James Carroll, Prairie Village, KS (US); Aaron August Sloup, Olathe, KS (US)

(73) Assignee: DIEM AI, LLC, Lenexa, KS (US)

( * ) Notice: Subject to any disclaimer, the term of this patent is extended or adjusted under 35 U.S.C. 154(b) by 96 days.

(21) Appl. No.: 16/598,934

(22) Filed: Oct. 10, 2019

Related U.S. Application Data

(60) Provisional application No. 62/743,648, filed on Oct. 10, 2018.

(51) Int. Cl.
*H04L 9/40* (2022.01)
*G06F 21/62* (2013.01)
*G06Q 20/22* (2012.01)

(52) U.S. Cl.
CPC .............. *H04L 63/10* (2013.01); *G06F 21/62* (2013.01); *H04L 63/0407* (2013.01); *H04L 63/06* (2013.01); *G06F 2221/2141* (2013.01); *G06Q 20/22* (2013.01)

(58) Field of Classification Search
CPC ......... H04L 63/10–108; H04L 63/0281; H04L 63/06; H04L 63/04–0421; G06F 21/62–629; G06F 2221/2141; G06Q 20/22
See application file for complete search history.

(56) References Cited

U.S. PATENT DOCUMENTS

| | | | |
|---|---|---|---|
| 6,539,232 B2 | 3/2003 | Hendrey et al. | |
| 7,310,676 B2 | 12/2007 | Bourne | |
| 7,353,034 B2 | 4/2008 | Haney | |
| 7,418,268 B1 | 8/2008 | Cabano et al. | |
| 7,483,871 B2 * | 1/2009 | Herz | G06Q 30/02 |
| 7,620,404 B2 | 11/2009 | Chesnais et al. | |
| 8,010,601 B2 | 8/2011 | Jennings et al. | |
| 8,204,513 B2 | 6/2012 | Crowley et al. | |
| 8,229,456 B2 | 7/2012 | Schnurr | |
| 8,554,283 B1 | 10/2013 | Behbehani | |

(Continued)

OTHER PUBLICATIONS

US 6,731,928 B1, 05/2004, Tanaka (withdrawn)
(Continued)

*Primary Examiner* — Madhuri R Herzog
(74) *Attorney, Agent, or Firm* — Dicke, Billig & Czaja, PLLC

(57) ABSTRACT

The present disclosure provides a method of access to users of a network system via a unique identity key that controls access and permission rights of outside entities as controlled by the entity itself. The system assigns unique identity to a unique entity. The key is responsible for facilitating preferred access types and information accessed by outside entities, and acts as a signal for action, interaction and experience within the System as well as third party platforms. Each interaction within the system includes a requesting entity's proxy ('REP') sending an information access request ('IAR') to the deciding entity's proxy ('DEP') via a network. This IAR is routed to the correct DEP via the unique identifier. The DEP applies access preferences to allow or deny the IAR, in part or completely. If allowed or partially allowed, the DEP returns information to the REP.

22 Claims, 8 Drawing Sheets

(56) References Cited

U.S. PATENT DOCUMENTS

| | | | |
|---|---|---|---|
| 9,338,251 B2 | 5/2016 | Mehta et al. | |
| 9,390,450 B1* | 7/2016 | Hart | H04L 67/1097 |
| 9,562,783 B2 | 2/2017 | Bourne | |
| 10,237,276 B2* | 3/2019 | Gupta | G06F 16/13 |
| 10,749,844 B2* | 8/2020 | Olivier | H04L 67/10 |
| 2005/0283621 A1* | 12/2005 | Sato | G06F 21/6254 |
| | | | 713/189 |
| 2006/0031301 A1* | 2/2006 | Herz | G06F 21/6254 |
| | | | 709/206 |
| 2007/0143475 A1* | 6/2007 | Daigle | G06F 21/6245 |
| | | | 709/225 |
| 2007/0282621 A1 | 12/2007 | Altman et al. | |
| 2010/0036779 A1* | 2/2010 | Sadeh-Koniecpol | H04L 63/20 |
| | | | 706/11 |
| 2010/0280904 A1 | 11/2010 | Ahuja | |
| 2011/0143713 A1* | 6/2011 | Luft | H04L 63/04 |
| | | | 455/411 |
| 2011/0276639 A1 | 11/2011 | Schrader | |
| 2015/0199517 A1* | 7/2015 | Rose | G06F 21/562 |
| | | | 726/22 |
| 2015/0365393 A1* | 12/2015 | Shyamsunder | H04L 67/10 |
| | | | 726/4 |
| 2017/0344650 A1* | 11/2017 | Reinisch | G06F 16/24564 |
| 2019/0172285 A1* | 6/2019 | Jin | H04W 4/33 |

OTHER PUBLICATIONS

Backes, Michael, Matteo Maffei, and Kim Pecina. "A Security API for Distributed Social Networks." Ndss. vol. 11. 2011. (Year: 2011).*

"Friends Location", retrieved on Aug. 27, 2018 from https://play.google.com/store/apps/details?id=com.apps.exhesham.friendlocation; 3 pages.

"Friend Locator (Unreleased)", retrieved on Aug. 27, 2018 from https://play.google.com/store/apps/detail?id=map.karan.com.friendlocator; 1 page.

"Friend Locator", retrieved on Aug. 27, 2018 from https://play.google.com/store/apps/detail?id=abhisri17.friendlocator2; 2 pages.

* cited by examiner

SYSTEMS AND METHODS FOR AN ENTITY TO CONTROL INFORMATION EXCHANGE

CROSS REFERENCE TO RELATED APPLICATIONS

This Non-Provisional Patent Application claims the benefit of the filing date of U.S. Provisional Patent Application Ser. No. 62/743,648, filed Oct. 10, 2018, entitled "Social Networking Systems and Methods," the entire teachings of which are herein incorporated by reference.

BACKGROUND

Those with frequent access to the Internet have experienced an entire shift in world outlook, exposure, expectations and interactions.

The initial trajectory of the Internet and web-based communication began on a foundation that was open to whoever engaged with it. Sophisticated developers and the general public alike dove into the possibility to connect with loved ones far away, interest group niches of kindred spirits, to share knowledge and build team efficiencies to do and invent things only the Internet could support.

As the Internet grew, expanded and those interacting with it multiplied, in order to help organize what existed within the World Wide Web, a company like Yahoo grew to prominence by adding clarity through lists. Through the combination of computing growth and "average user" engagement, the Internet came into homes and hands via companies such as Apple that produced personal computing devices. When the amount of content on the Internet became so overwhelming that no average person, group of people or organization (collectively referred to herein as "entity" or "entities") could navigate it or the channels through which users are accessed, Google's platform rose as an index and sorting machine. As the Internet became a place for more personal transactions, companies like Facebook and LinkedIn grew in popularity as channels for sharing our lives and projects across the world.

For a time, the Internet followed this trajectory, private companies building platforms through which entities engaged with the Internet and others over the air data exchange technologies. Via these platforms, entities are thus channeled through specific entry points, limited communication channels or "walled gardens". Digital platform and technology builders have therefore shaped the form and function of the Internet so that the general public has little personal control.

Having minimal personal control has also impacted entities' influence over aspects of their own individual identity are accessed, seen and used. For example, to enjoy the benefits of socializing through web-based platforms, entities are routinely required to engage in an exchange of their personal information and, often, allow for surveillance of their behavior and ways of interacting. To help clarify the direction that the industry has taken, consider popular language to describe the current Internet ecosystem: "providers" build and maintain the platforms that open up to "users" who are attracted to the value—whether emotional, functional or for entertainment.

In this model, the platforms themselves are heavily invested in a particular engagement process and outcome. Value, from the platform-funding clients who pay for access to and data gleaned from the platform, increases as user engagement with the platforms increase. Engagement can include sharing personal information (media, opinions, desires, demographics, questions, etc.) as well as user-end client engagement such as shopping behavior. As long as the most valuable moments of the provider-user exchange are perceived to be how and how often an entity connects with a platform, or via the platform through to another landing point, most providers will seek to maintain this system and dynamic. As such, the experience and relationships among entities interacting on Internet platforms funded via this system will be influenced by factors that lead to the desired outcomes of the platform providers—which do not necessarily line up with the uninhibited preferences of the entities themselves.

To address this imbalance of control and value, some familiar with the dynamic have suggested equipping individual entities with more agency over how they are accessed —specifically over elements that have to do with them personally and which is defined by them internally—such as their personal information, views, wants, connections and history, collectively referred to as their "identity".

There are many examples of how control over one's identity is not actually in the control of the entity which that identity represents. For example, for an entity to access many services and companies via the Internet, they are required to (1) share some personally identifying information such as contact and demographic information, (2) create a site-specific login and password, and (3) agree to the company/platform/service terms and privacy agreements. This practice is often multiplied across hundreds of platforms, sites and devices often with no real understanding on the part of the entity where their information has gone, how it is being used, and little to no ability to "take it back" if they no longer wish to have a relationship with that provider. In extreme cases, drones can fly virtually anywhere, capturing images and audio of any entity without the entity's permission. In all cases, retribution is only retroactive and often incomplete.

One can see how levels of distrust, disillusionment and a sense of helplessness pervade. Seen in these examples, not only is the balance of control uneven, there is an imbalance of rights and freedoms. When personal control is incomplete and rights and freedoms are not respected by all parties involved, entities will not fully engage in what could potentially be very useful, even joyful experiences that technologies and methods of technological applications could provide.

Placing this access mandate in the hands of the entity will create a so-called "identity layer" of the Internet, providing individuals with the tools to engage with others on their terms and acknowledge the rights and freedoms they have. Ultimately, the entity is the arbiter of what is happening to them.

In view of the above, a need exists for social networking systems and methods that redefine how people engage with powerful tools at their disposal, but on their own terms and in a way that mirrors real human behavior. The present disclosure aims to support more individual control over their identities, with the belief that, that which defines you should be controlled by you. And that, by extension, we are all best served when those things we value are controlled by us.

SUMMARY

Aspects of the present disclosure related to systems and methods for facilitating interactions across an electronic network (e.g., a social network), for example by supporting how an identity of a particular client or registered user of the network (or an "Entity") is accessed by others on the terms of that Entity. As used throughout the present disclosure, an "entity" can be a person, an organization, a group of people, or a group of organizations, an "Entity" is in reference to an entity that is a client or registered user of the network system. With this in mind, a unique, identifying access key ID is generated for the Entity and represents that Entity within the network. The identifying access key ID carries or is electronically associated with instructions for allowable types of access and relationships with other entities, including entities that are registered users of the network system (e.g., have their own unique, identifying access key ID) and those that are not.

In some non-limiting embodiments, the unique, identifying access key ID created and implemented by the systems and methods of the present disclosure is an alpha-numeric string preceded by the symbol "&". All Entities registered within the system are assigned a unique, identifying access key ID that begins with the symbol "&". Following the "&" symbol, each combination of characters will be unique per Entity. In some embodiments, then, "&" acts as an identifier that the unique identity is associated within the network system and signals a set of access permissions and rights as controlled by the corresponding Entity. In some embodiments, the unique, identifying access key ID can be referred to as an "& handle". Other unique, identifying access key ID formats are also envisioned in other embodiments.

The Entity associated with the unique, identifying access key ID (e.g., an & handle) designates one or more rules or preferences relating to interactions with others within or through the network system. The identifying access key ID and corresponding rule(s)/preference(s) serves as the Entity's proxy within the network system. Each interaction within the network system is governed by a process including a requesting entity's proxy ("REP") electronically sending an information access request ("IAR") to the deciding Entity's proxy ("DEP") via a network. This IAR is routed to the correct DEP via the DEP's identifying access key ID (e.g., the DEP's & handle). The DEP exercises its agency through personally defined access rights and permissions in order to allow or deny the IAR, in part or completely. If allowed or partially allowed, the DEP returns information to the REP via the network. In this embodiment, agency represents an Entity's explicit and implicitly preferred rights and access permissions, and may include contextual information such as the current location of the entities, and relationship parameters.

The exchange between a REP and DEP can be best understood as a symbiotic relationship, or mutually reinforcing and beneficial. The Entity associated with the DEP may be more likely to engage with the entity associated with the REP because the Entity associated with the DEP trusts that the network system respects their rights and preferences. The DEP also has the ability to completely turn off access via the network system if they so choose. The entity associated with the REP can respectfully engage in an IAR knowing that they will only receive information and access that has the approval of the Entity associated with the DEP. The relationship as a whole benefits knowing that the network system is not invested in the relationship or engagement evolving in any particular way, and thus will not seek to influence how the two interact.

With some systems and methods of the present disclosure, the nexus of control and agency exists like a spoke and wheel, where a given Entity is the center, single point of access for everything that has to do with them (information, connection, communication, authorization, agency, etc.), and to whom the outside world has to acquire permission to access. That permission is granted by the Entity itself, on their terms. This control is dynamic and absolute. Entities feel they are in control because they also have the ability to completely turn off another entity's ability to access them via this process. In some embodiments, each Entity is always in as active control as they want to be for all information connected to their unique identity/proxy including by way of non-limiting example: access to the unique identity associated with a corresponding application, all personal identifiers, including elements such as location, image, name, and other associated profile information such as past behavior.

The enabling platform itself does not have any right to access a given entity's information or to communicate with an entity beyond, perhaps, system updates and information. Some of the systems and methods of the present disclosure operate from the perspective that trust in intention and privacy will become one of the most important design elements in any system. With some systems and methods of the present disclosure, personal control over access and privacy is integrated into every element of the experience, thus protecting privacy from a variety of angles. With these and similar embodiments, because it will become a normalized aspect and expectation of the system, there will be consequences for how entities experience the System. Therefore in some embodiments, information and media shared through the system is encrypted, decentralized. The host or platform provider has no ownership or access to it beyond anonymized machine learning to build more personalized and powerful support system for each entity and the system as a whole. Those who engage with the system are always, in some embodiments, in the driver's seat, with power over information associated with them in their own hands.

DETAILED DESCRIPTION

Systems and methods of the present disclosure relate to and address communications between entities, devices, platforms and within Internet networks. The terms "network", "system" and "network system" are used interchangeably throughout the present disclosure. Technologies that facilitate this type of interaction include the Internet, cables, and technologies for transmitting data over the air such as radio technologies such as Bluetooth, GPS, WiFi, cellular, and light-based technologies such as infrared, sound-based technologies such as ultrasound, henceforth collectively referred to as Over-the-Air technologies (OTA). Additional methods include visual technologies, facial recognition (or other biometric or code) or any other method as is apparent to one of ordinary skill.

Aspects of the present disclosure are directed to network systems and methods, the operation of which can be facilitated, for example, by an application or "app" loaded onto a mobile device or similar that in turn is formatted to provide wireless communication between the device/app and other devices/apps and/or a server. In some embodiments, the systems and methods of the present disclosure are referred to herein by, or as, "the access key," "the process," the "system" or "App". The "process" is both implemented by the system and manifests through the app, internet web pages, hardware, software and any other method obvious to someone of ordinary skill. In other words, the process equips an entity with control via the system performing a series of predetermined operations. In general terms, the systems and methods of the present disclosure can incorporate features that are at the forefront of experiences that support relationships but that keep the technology in the background, knowing it's there to act as a boost and a tool to help entities connect with each other and the experiences they want in the real world.

When first logging into the system (e.g., via the App), an entity is prompted to enter minimal, but identifying information such as phone number (to confirm identity and initial device to be used to access the platform), email address (or other method by which information can be exchanged between the entity and the network system), etc. As described in greater detail below, a newly registered entity to the network system is assigned a unique, identifying access key ID. An entity registered to the system is referred to herein as an "Entity"; each Entity can interact across the network system with other Entities (i.e., other entities that have also been registered to the network system) and with non-system entities (i.e., other entities that have not been registered to the network system).

Figure 1:
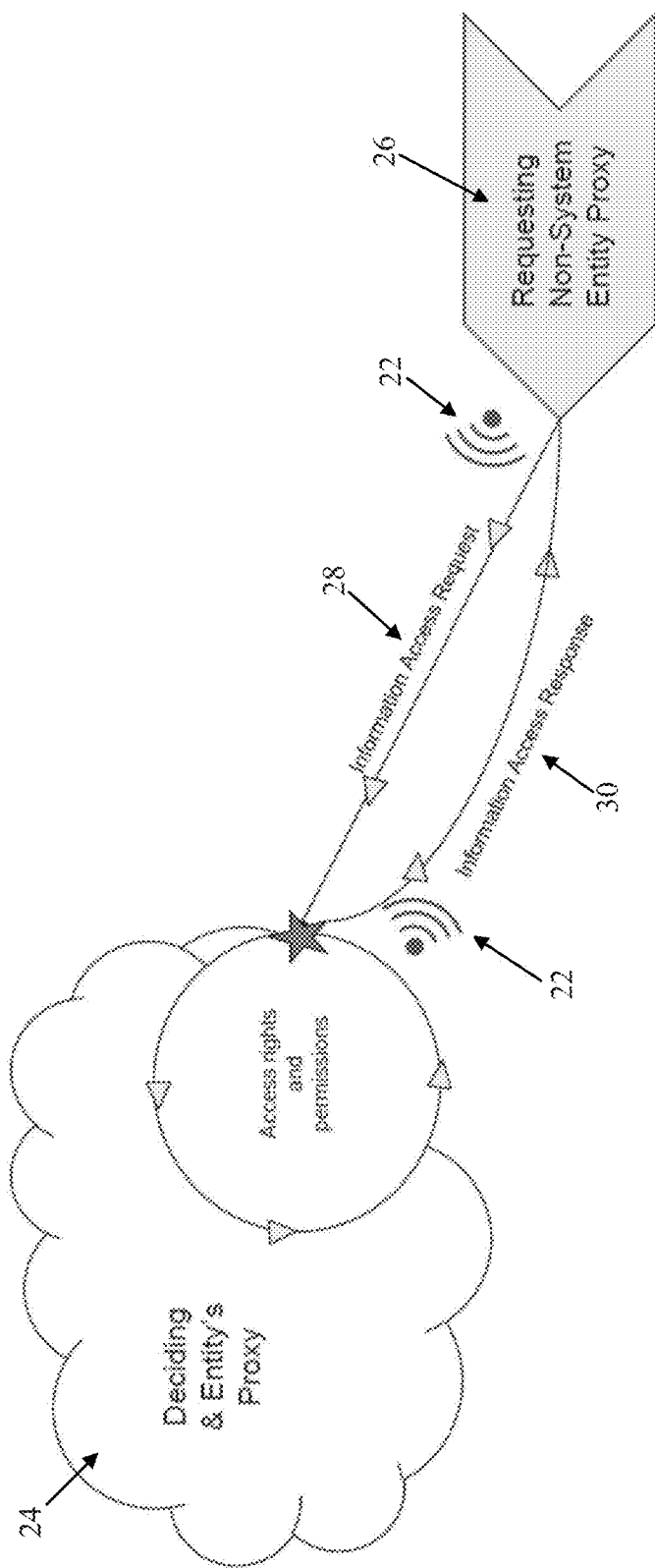
FIG. 1 is an illustrative block diagram of a network system of the present disclosure, and depicts methods of facilitating interactions between entities connected to the system in accordance with principles of the present disclosure such as a first entity sending an information access request to a second entity.

FIG. 1 represents a network system 20 programmed to operate or perform some of the methods of the present disclosure. Various entities can interact with or within the system 20 via a network 22, including a one entity requesting to interact with a second entity. That second entity decides whether or not to interact with the first entity, and on what terms. Entities can interface with the system 20 via a designated proxy. With this in mind, a deciding entity within the system 20 is identified by a "Deciding Entity Proxy" (or "DEP") 24 (as a point of reference, in some embodiments the Deciding Entity Proxy within the system 20 can be implicated by a unique, identifying access key ID that begins with the symbol "&"; thus, FIG. 1 reflects the DEP 24 as "Deciding & Entity's Proxy"). Some methods for establishing the DEP 24 within the system 20 are described in greater detail below. In more general terms, the DEP 24 can consist essentially of software running on a microprocessor and a data store. An entity desiring to interact with the DEP 24 via the system 20 is identified by a "Requesting Entity Proxy" (or "REP") 26. As a point of reference, with the non-limiting example of FIG. 1, the REP 26 is not established within the system 20 in the same manner as the DEP 24, and thus does not have a unique, identifying access key ID and is thus referenced as a "Requesting Non-System Entity Proxy" (or "RNSEP")). In other examples, a REP seeking to interact with a DEP can also be established in the system 20 and thus have a unique, identifying access key ID.

Each interaction between entities within the network system 20 is governed by a process including an information access request ("IAR"). With the examples implicated by FIG. 1, the REP 26 desires to interact with the DEP 24 via the system 20, and an IAR 28 from the REP 26 to the DEP 24 is sent via the network 22. It will be understood that in some embodiments, a multiplicity of entities will have been established within the system 20. The IAR 28 is routed to the correct DEP 24 via a unique identifying access key ID for the DEP 24, such as an alphanumeric string of characters, a set of audio tones, a pattern of non-visible light, or any other technique as is apparent to one of ordinary skill. The DEP 24 applies access rights and permissions selected by the entity corresponding with the particular DEP 24 in order to allow or deny the IAR 28, in part or completely. If allowed or partially allowed, the DEP 24 prompts a response 30 in which information is provided to the REP 26 via the network 22. The systems and methods of the present disclosure provide agency to entities participating in the system 20, with this agency representing an entity's explicit and implicitly preferred rights and access permissions, contextual information such as the current location of the entities, and relationship parameters.

The unique identifying access key ID may use the alpha-numeric format such as "& 123BC67" wherein following the "&" symbol, each combination of characters will be unique per Entity. This alpha-numeric format, when connected to a unique entity, is commonly referred to as a "handle". In the present disclosure, "&" acts as an identifier that the unique identity is associated within the system 20 and signals a set of access permissions and rights as controlled by the corresponding entity. Entities may choose a customized handle reflecting, for example, their first and last name. As there are many people and non-people with duplicate names, the underlying alphanumeric code will be unique among all entities. Henceforth this method of access will be referred to as "&".

The use of "&" before the assigned, unique access key ID will also act as a signal for action, interaction and experience within the system 20, as well as third party platforms, such as in email signatures or other social platforms. By way of example, if the REP 26, whether using or not using the &, sends an IAR in the form of an email to a DEP's & handle, the system 20 will apply the access permissions of the DEP 24 to determine whether that particular REP 26 has been accorded access rights to send an email to the REP 26. If the access rights have been given, the email will be delivered.

The types and/or format of the access rights and permissions assigned by an Entity to its corresponding unique identifying access key ID (e.g., & handle) can take various forms. In some embodiments, the unique identifying access key ID and corresponding proxy is responsible for translating how that Entity feels about each relationship that the Entity currently or could potentially have with another entity. To that end, the unique identifying access key ID can carry or be electronically tied to instructions for allowable types of access and relationships with other entities. A variety of accessibility rights within the network systems of the present disclosure allows the particular user/Entity to make themselves more or less accessible and "open" to other entities (that are or are not authenticated within the network system 20) as described by common relationship types in some embodiments. Some non-limiting examples of possible access levels (or "openness settings") for an Entity to select from can include: Inner Circle (least visible/least access by other entities); Friends; Associates; Acquaintances; Human (most visible/greatest access by other entities); Avoid; Blocked; etc.

In some embodiments, a particular user/Entity can select a desired "accessibility" from the available levels. The particular user/Entity can change this setting at any time. The systems and methods of the present disclosure are, in some non-limiting embodiments, programmed or configured to adjust these settings automatically for the particular user/Entity based on other information. For example, if the particular user/Entity has turned on or selected a "Private at Home" (or the like) setting and set their home location, the system would automatically adjust the particular user's/Entity's "Openness" setting to make them less open, and thus more private, when they are at or nearby their home. In some embodiments, the systems and methods of the present disclosure are programmed or configured such that the initial information exchanged between two active Entities establishes whether or not access is possible as described below.

In certain embodiments, a REP is not requesting information from a DEP but rather how to send data to a DEP, in other words, how would the DEP prefer to receive information from the REP in question. By way of example, Angelo, who is reading an article about trees comes across an interesting story that he would like to send to Alice. He pauses to think to himself, how should I send this to her? An email, a text message, something else? What do I prefer? What does she prefer? How have we communicated in the past? With some embodiments of the present disclosure, Angelo can highlight the information he wants to send and start typing, via a keyboard that appears as an overlay to the article "&Al . . . ". His friend, &Alice automatically appears. Angelo clicks on the link and Alice receives the link as she has set preferences to receive it—from Angelo (a friend, and therefore allowed to access) and a link (into her list of 'to read' articles saved in a browser).

By way of further example, some methods of the present disclosure can be implemented to incorporate one or more of the following steps as understood by one of ordinary skill: 1) code running in the browser (as a browser widget or executing directly as part of the browser code; 2) REP authenticates which activates their unique identifying access key ID (e.g., & handle) in that browser; 3) encrypted set of relationships is downloaded to decide operating the browser or streamed via a network; 4) in that browser, the REP selects a piece of content to share; 5) the entity associated with the REP invokes the sharing mechanism (e.g., types the "&" character) and specifies the entity or entities they'd like to share with (e.g., by typing the unique identifying access key ID (e.g., & handle) assigned to the entity/entities of interest, saying the name of the desired entity/entities verbally, etc.); 6) REP acknowledges that the entity associated with the REP wants to send the content; 7) the system determines the best way to send the content based on a review of the corresponding DEP's preferences, the REP's preferences, and available ways to send the content in question; 8) the system sends the content via the determined best method, or provides an error message back to the REP if the content cannot be sent.

Figure 2:
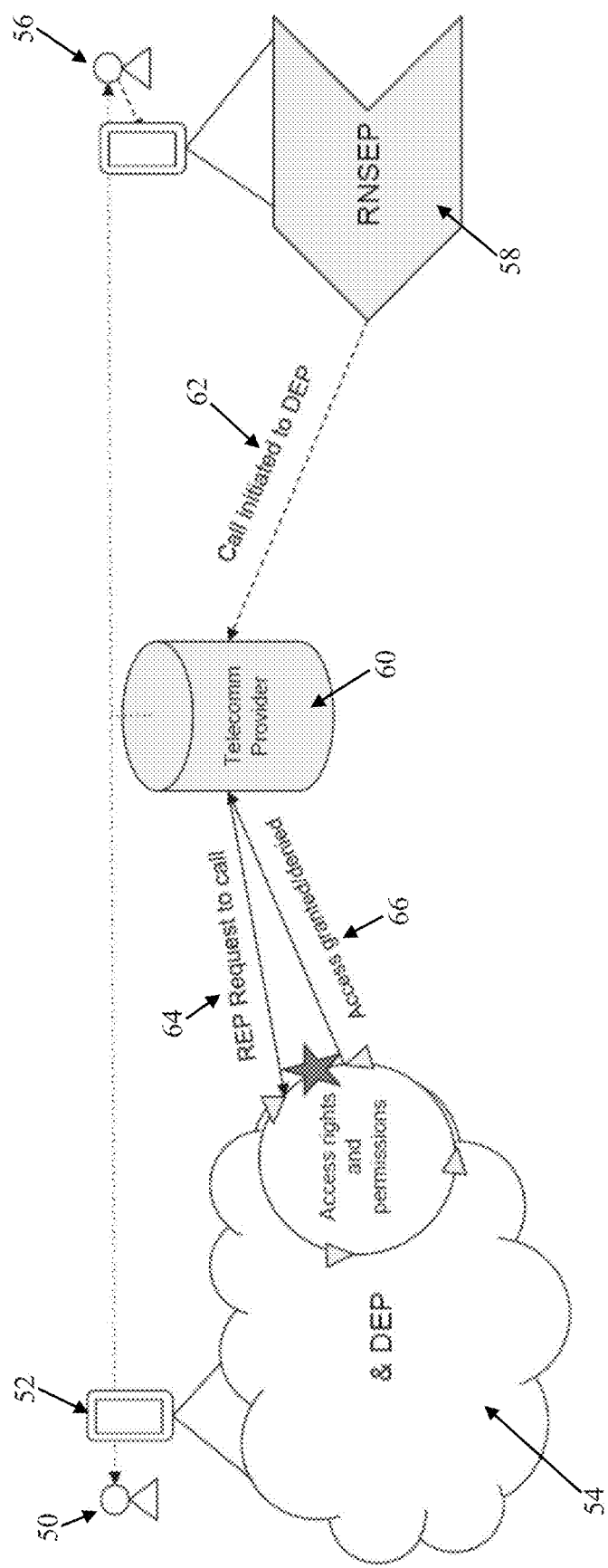
FIG. 2 is an illustrative block diagram of a network system of the present disclosure, and depicts methods of facilitating interactions between entities connected to the system in accordance with principles of the present disclosure such as a first entity attempting to place a phone call to a second entity.

By way of additional non-limiting example, with some systems and methods of the present disclosure, a DEP can also signal "no access permitted". For example, FIG. 2 reflects a deciding entity 50 operating a device 52 (e.g., smart phone) that in turn is associated with a DEP 54 ("& DEP" in FIG. 2) as part of system of the present disclosure. The deciding entity 50 is associated with a particular phone number. A third party requesting entity 56 is attempting to call the deciding entity 50 using the phone number of the deciding entity 50, with the attempted call being formatted by an "RNSEP" 58 of the requesting entity 56. As a point of reference, the requesting entity 56 may access the phone number of the deciding entity 50 in a variety of ways (e.g., already in their contact list, public searches, etc.). The attempted call is forwarded (or "initiated") via known technologies to an intermediary 60 at 62. The intermediary 60 (e.g., a telecom provider) of the attempted phone call makes an IAR 64 to the DEP 54, requesting permission to connect the phone call. The access rights and permissions associated with the DEP 54 can include whether or not incoming calls from unrecognized entities are acceptable. Assuming the request for phone connection 64 implicates an unrecognized entity, the DEP 54 may or may not allow the phone call to be put through to the deciding entity's device 52 depending upon the rights and permissions provided with the DEP 54. If the DEP 54 allows the requesting entity 56 to connect, the call will be put through to the deciding entity's device 52. If the DEP 54 does not recognize the RNSEP 58 and the rights and permissions provided with the DEP 54 do not allow for unrecognized calls, the call will not be put through (reflected at 66 in FIG. 2). Being able to stop access is a benefit to those who do not want to be contacted via various channels including but not limited to phone numbers or emails. The DEP 54 can signal to companies who provide telecommunication and internet access channels that they do not want to receive calls or emails from numbers or emails not in their contact list and numbers or emails of known spam or "robo" calling numbers.

Returning to FIG. 1, in some non-limiting embodiments, a given REP does not know that a DEP exists, but can discover their & (or other unique identifying access key ID), and therefore engage in future IAR. By way of example, Rashid meets Sofia at a bus stop. Whereas currently Rashid may ask for Sofia's number, using the systems of the present disclosure, Sofia can tell Rashid that she prefers to be contacted via her "&Sofia" (or other unique identifying access key ID). Based on her access preferences set to Rashid, he may or may not ever see her phone number or last name.

By way of further non-limiting example, an entity's & (or other unique identifying access key ID) may be accessed from a URL link outside the system 20. The system 20 may use a URL, such as https://diem.ai/?id=bill, encoded with a URL from another platform, such as LinkedIn, to allow the system 20 to recognize and process that interaction (the LinkedIn page for Bill) when clicked. As within relationships that begin within the system 20, "&bill" (or other unique identifying access key ID) will then have all control and rights to determine the type of relationship they want to build (or not) with the requesting entity. The & handle (or other unique identifying access key ID) is not indefinitely tied to any current identifiers such as phone number, email or other social applications.

Thus, in some embodiments the network systems of the present disclosure are programmed or configured to support ways through which relationships inside the system can be influenced by outside entities, third parties and machine learning. For example, and as described above, each & handle (or other unique identifying access key ID) also serves as a possible link through which to connect on a platform outside of the App or system. Although the Entity's & handle may be visible on public platforms such as other social media sites or email signatures, as with all relationships within the system, if a REP sends and IAR, the DEP will retain all rights to allow and govern access. By way of example, a social networking platform such as LinkedIn can make visible the & handle associated with an Entity's profile page. As an illustration, if Sarah sees a & handle as it is associated with the Entity &Ben on his LinkedIn profile page, Sarah, the REP, can send an IAR to &Ben. The request is then sent to Ben via text, LinkedIn message, email, etc., through the App or through other means based on how &Ben allows entities like Sarah to contact him via LinkedIn.

Figure 3:
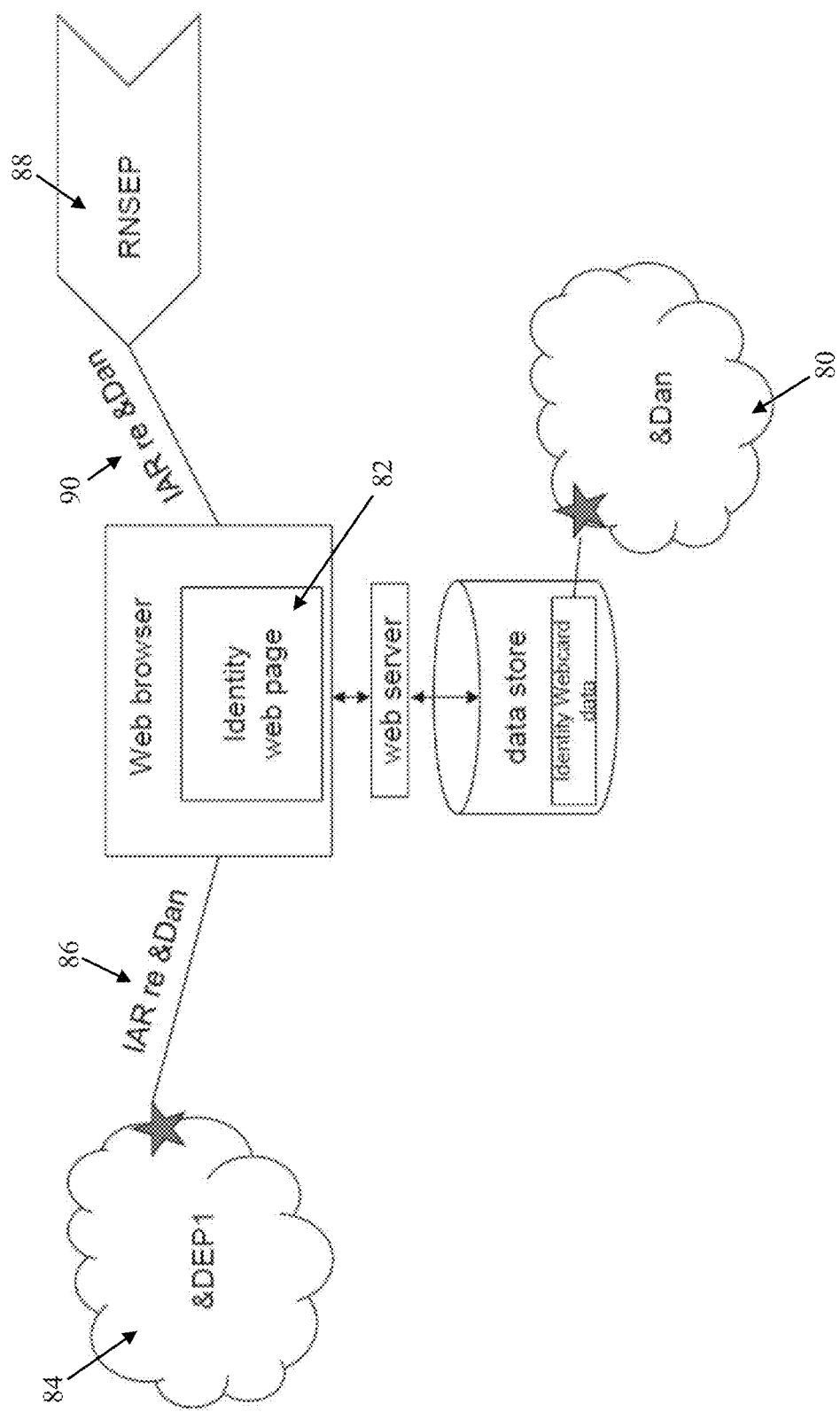
FIG. 3 is an illustrative block diagram of a network system of the present disclosure, and depicts methods of facilitating interactions between entities connected to the system in accordance with principles of the present disclosure such as a first entity accessing a web page of a second entity.

Beyond access through specific platforms, a general internet search by an entity through a browser may also call up information about a given Entity authenticated in the system 20. For example, FIG. 3 reflects that with some access methods of the present disclosure, the information related to a DEP called up via a browser can be controlled by the DEP through their & handle (or other unique identifying access key ID). By way of example, FIG. 3 identifies a DEP 80 ("&Dan") for which a web page 82 representing information about the DEP 80 has been established, such as related social network profiles, email, phone number, demographic information, etc., may be made available. Another DEP 84 authenticated in the system 20 ("&DEP1") may send an IAR 86 to access the web page 82. FIG. 3 also reflects that an REP 88 ("RNSEP") not otherwise authenticated in the system 20 also may send an IAR 90 to access the web page 82. As with any IAR to a DEP, the DEP 80 determines what information is accessible, to whom, and with complete control to turn off access at any time. In some embodiments, third party information facilitators such as social networks, indexes, browsers, software, and hardware providers (e.g., the REP 88) will not be allowed any access to a given DEP through their access key & handle. In some embodiments, access will only be granted through the system 20 and not other communication channels such as phone number or social network profile.

By way of further non-limiting example, a search engine may store ID level information at the approval of a DEP to enable the discoverability of the & handle (or other unique identifying access key ID) via the search engine system. The search engine may receive that information directly from the DEP itself. The DEP sets rules for how the browser can act as a facilitator to a REP seeking information about a DEP via the browser system. Conversely, a DEP may be allowed to make a specific request of a third party to no access their information via the & access method. This declaration is commonly known as an "opt out" option or a "do not call" telephone communication. The DEP will also control information that had been accessed previously such that the third party or browser cannot indefinitely hold data transferred via its platform indefinitely.

Figure 4:
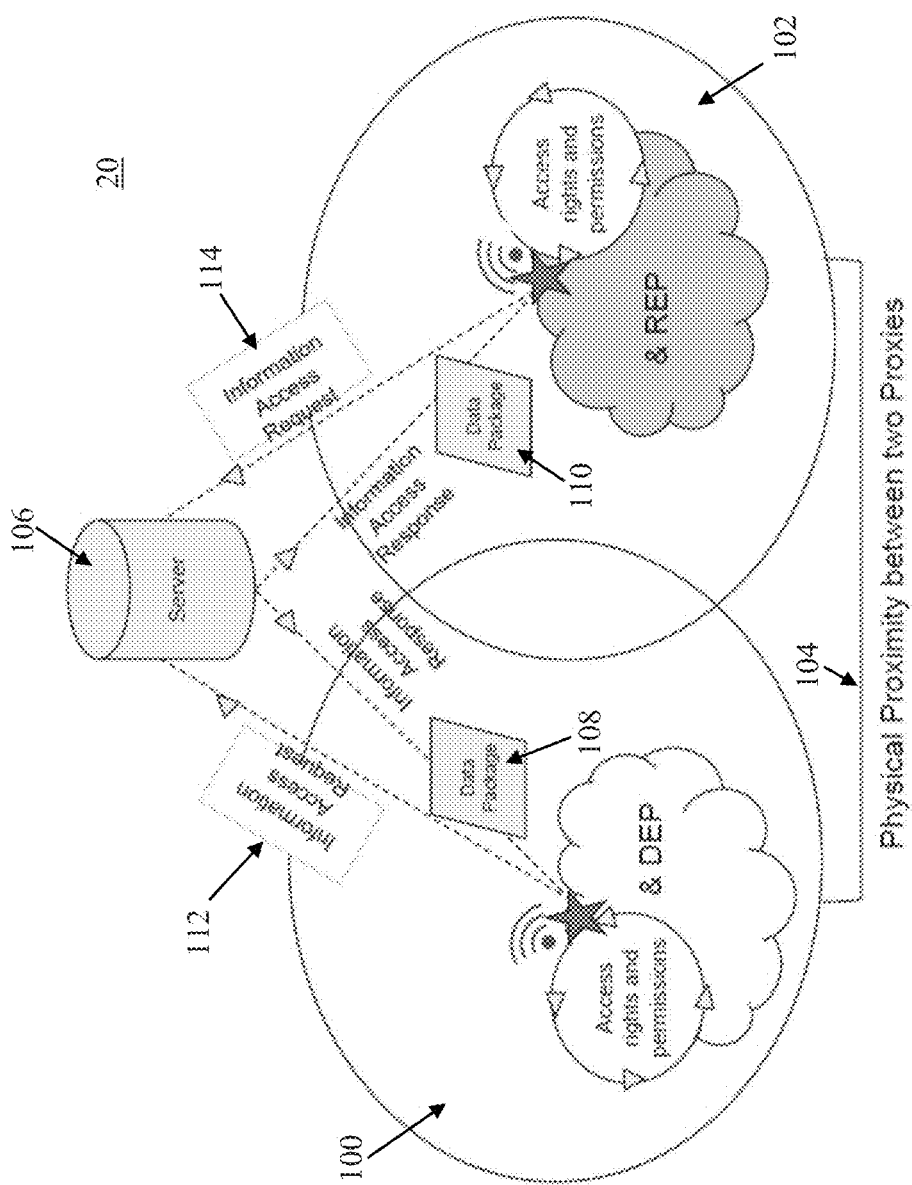
FIG. 4 is an illustrative block diagram of a network system of the present disclosure, and depicts methods of facilitating interactions between entities connected to the system in accordance with principles of the present disclosure such as electronically connecting two entities based on a proximity limit.

Returning to FIG. 1, with some systems and methods of the present disclosure, interaction limits are set via software and hardware, such as third party or location-based services within the system 20. Once again, an "Entity" is in reference to an entity (e.g., person, group of people or organization) authenticated or registered within the system 20 (e.g., has an assigned, unique identifying access key ID such as the & handle). OTA technologies placing a user/Entity at the center of a proximity range, or similar technologies determine the approximate current physical position of the Entity. The access and preference controls that an Entity has can be applied to interactions within a physical space. The physical proximity may be, for example, a 500 meter limit, which is tethered to the Entity as defined by the physical location of the Entity's unique identity. FIG. 4 is a representation of a "proximity spotlight" assigned to two Entities actively participating in the system 20, including a first Entity represented by a system proxy 100 ("&DEP") and a second Entity represented by a system proxy 102 ("&REP"). The physical proximity awareness and access features of some embodiments of the present disclosure provides that when the two Entities are in physical proximity to one another, the systems and methods of the present disclosure can facilitate possible interaction between the two Entities. For example, the system 20 can establish a designated physical proximity limit 104. Further, the system 20 can determine a current physical distance between the two Entities. For example, by physical parameters as measured by OTA technologies. Or as determined by a GPS system supported by the Internet over a server 106, with each Entity reporting their position to a central registry operated by the server 106. When the determined current physical distance between the first and second Entities is equal or less than the limit 104, the system 20 can operate to facilitate a possible interaction between the two Entities.

As a point of reference, FIG. 4 further represents that in some embodiments, the entity proxies 100, 102 can send a data package 108, 110, respectively, to the server 106, as defined by access rights and permissions, including physical location. Further, various IARs 112, 114 can also be sent, and can include physical presence-based queries such as payment by presence, accessibility preferences of other devices, relationship preferences, identification preferences, etc. Under circumstances where the access rights and permissions associated with proxy 100, 102 of the two Entities are in agreement and the determined physical distance is not greater than the proximity limit 104, a possible interaction between the two Entities is initiated by the system 20.

To better ensure that an Entity's personal and relationship information stays private and in their sole control, the systems and methods of the present disclosure can take steps to integrate decentralized, distributed, localized information storage, encryption, and blockchain technologies. Example software of distributed storage may include storing and caching data locally on an entity's device, such as a smartphone. This could be storing just on the Entity's device or on N number of devices. For example, ten devices could have an encrypted copy or reference code to an entity's data as backups. A referencing code can be used to reassemble all information held within the identity or individuals history (including activity, contacts, preferences, profiles, media, etc.) such that data may be repopulated at any time, including if the system 20 ceases to exist as a formal organization.

In terms of decentralized data storage, M number of server nodes in a platform's network could have a copy of that data. Such decentralization of an individual entity's data is aimed to avoid centrality of data storage. Data centralization has seen higher risks of data breaches and risks power concentrations in any one part of the system 20. Additionally, by decentralizing communication pathways, Entities can interact with each other via the access methods of the present disclosure without needing to be routed through a central system or server. Stored and exchanged locally, the access methodologies, unique identifying access key ID and related rights and permissions can continue to operate on behalf of the DEP without an Internet connection or intermediary.

Encryption can include public/private key encryption, one-way hash encryption or similar technologies and algorithms. The systems and methods of the present disclosure can encrypt sensitive data in transit and at rest. Blockchain could be used to ensure the order, identity and authenticity of various transactions on the platform, using previously verified transactions linked to the next transaction. An example would be a change to one side of a relationship could verify that the Entity changing it is indeed the correct Entity and that the change happened in some order with respect to other deterministic events that happened previously. The systems of the present disclosure can use methods including but not limited to public/private key encryption or other cryptographic methods to securely exchange that information via OTA. Beyond protecting individual information privacy, the system 20 can pursue methods and technology for sharing information among entities private and in a manner that ensures as much personal control over information as possible.

To honor the Entity which desires the least amount of access by an outside entity, interaction will follow the rights and freedoms of the least open/accessible (vs. most open/accessible) setting of the entities that are exchanging information. In this regard, this initial "exchange of information" may not be directly conveyed or displayed to one or both of the particular Entities via a display device carried by the corresponding Entity (e.g., an App loaded onto a smart device carried by the Entity and communicating within the system 20), and instead occurs "behind the scenes" on the system 20.

Via machine learning, the system 20 may also influence the appearance of a relationship within the system 20. For example, the system 20 may be programmed to lessen the appearance of a certain Entity if another Entity has never chosen to pursue an interaction with them (implying that this acquaintance is not of interest). By way of further example, Entities within the physical parameters may be suggested as interesting or preferable based on system's awareness of preferences and behaviors of similar profiles (e.g., Entity Mark may see certain entities highlighted and more visible, such as entity Belgian Beer Bar, which also has its own & handle, because other Entities with profiles and preferences similar to Mark repeatedly go to Belgian Beer Bar). Additionally, as the context (physical, digital, relational, etc.) of an entity changes, whether it be how they want to interact on the internet or changing physical locations, access preferences may also evolve based on predetermined or current preferences or machine learning. For example, as an Entity's physical location changes, entities can impact how they are accessed vis a vis the preferences their & handle has on those around them. By way of further example, the location of an electronic device on which an Entity is operating the Entity's corresponding & handle is the nexus of the proximity parameter established by the system 20 as an &-influenced social space. The system 20 can optionally be programmed or configured to prompt the Entity to modify their access preferences when they are at or nearby places where other Entities tend to be more accessible to face-to-face social interactions. An example of this could be a neighborhood picnic where people are often open to meeting and establishing new relationships with other people. As such, Entities are equipped to govern their information and how they engage in such situations.

By further non-limiting example of machine learning within the system 20, and as an example manifestation of asymmetric relationships, the system 20 can influence how an Entity's contact list and initial access preference settings appear for a given contact. If Bob lists Mary by her phone number in his contact list on the system 20, but Mary does not have Bob in her contact list on the system 20, the system 20 will set parameters for Bob's half of the relationship, but treat Mary's half of the relationship as if she does not know Bob. This principle, when combined with honoring the "least accessible" principle mentioned previously, ensures that Mary can remain private from Bob and that their relationship is treated as if they do not know each other until Mary changes the parameters or reciprocates in some way. Additionally, in keeping with the spectrum built through machine learning, Bob—because he has gotten Mary's number in some fashion—will not be treated as complete a stranger as someone who has no notable past interaction with Mary at all.

The expression and experience of the interaction is influenced by the system 20, which honors preferences set by each side of the relationship. If preferences differ from the perspective of each Entity, the system 20 supports an asymmetric relationship (i.e., if one side perceives the relationship to be stronger or weaker than the other). Once two Entities begin to interact, the accessing rights and freedoms to one another influence which interaction possibilities are set into motion. Asymmetric in this case refers to the ability of each Entity in the relationship to define its own parameters of the relationship, such as the relative strength or classification of the relationship. This asymmetric quality will inform all interactions and relationships between all Entities.

Figure 5:
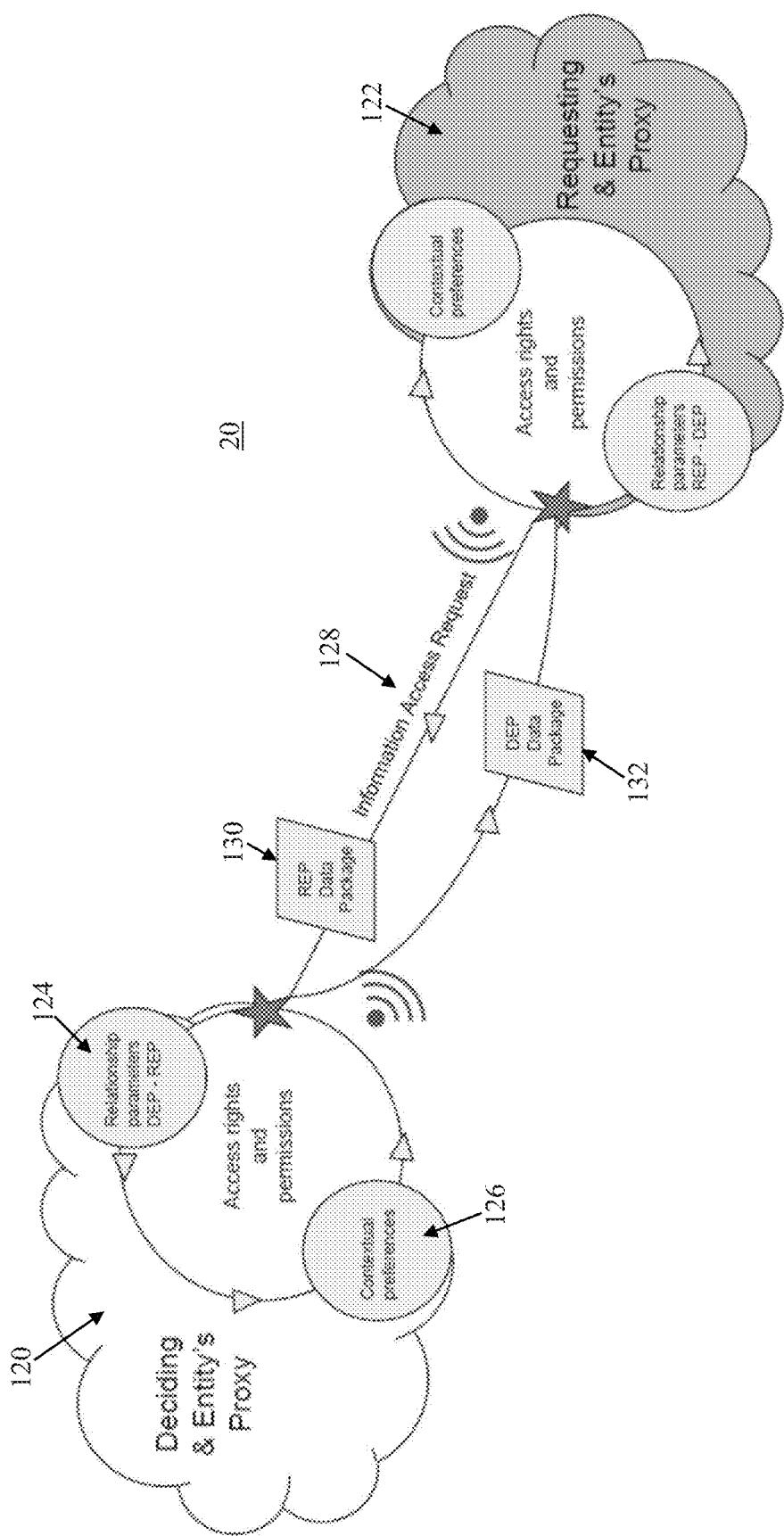
FIG. 5 is an illustrative block diagram of a network system of the present disclosure, and depicts methods of facilitating interactions between entities connected to the system in accordance with principles of the present disclosure such as a first entity attempting to electronically connect with a second entity.

A further understanding of the asymmetric relationship methodologies of the present disclosure is provided by FIG. 5 in which a DEP ("Deciding & Entity's Proxy") 120 and a REP ("Requesting & Entity's Proxy") 122 are identified as part of the system 20. The DEP 120 manages its access rights and privileges through the assigned, unique identifying access key ID (e.g., alphanumeric code beginning with the "&" symbol). Similarly, the REP 122 manages its access rights and privileges through the assigned, unique identifying access key ID (e.g., alphanumeric code beginning with the "&" symbol). As identified at 124, the DEP 120 can further have or establish relationship parameters that can refer to access rights level in terms of how much access to identify information the Entity associated with the DEP 120 permits any other given Entity. Identity information can include, for example, name, picture some or all contact information, location, resume, service preferences, etc.

Parameters can be labeled with common relationship signifiers such as "inner circle", "friends" and "acquaintances". Parameters can also include relationships between person and non-person Entities, such as a person and their bank. The REP 122 can similarly have or establish relationship parameters specific to the Entity associated with the REP 122. Where the relationship parameters differ between the DEP 120 and the REP 122, an asymmetric relationship is established. As identified at 126, the DEP 120 can further have or establish contextual preferences specific to the Entity associated with the DEP 120. Contextual preferences may impact access rights such as time of day, location, information requested, relationship status, etc. The REP 122 can similarly have or establish contextual preferences specific to the Entity associated with the REP 122.

With the above explanations in mind, FIG. 5 illustrates that in response to or as part of an IAR 128 from the REP 122 to the DEP 120, a REP data package 130 is provided to the DEP 120 and a DEP data package 132 is provided to the REP 122. The data packages 130, 132 reflects the information response as defined by the access rights and permissions, contextual preferences and relationship parameters as defined by the DEP 120 in terms of the REP's IAR 128. Where an asymmetric relationship exists between the two Entities, the system 20 can select from more restrictive interaction preferences associated with both the DEP 120 and the REP 122.

The above explanations inform that the systems and methods of the present disclosure can, in some embodiments, mimic natural socialization and relationships, in this case the reality that not all relationships are viewed the same from both sides. Relationship dynamics are controlled individually—not determined by set definitions from the platform, therefore acknowledging and supporting asymmetric relationships. The systems and methods of the present disclosure can optionally enable asymmetric relationships by providing Entities (e.g., via the corresponding App) with levers to easily modify, personalize and reflect how each entity individually views the relationship. Setting up a system where dual-sided approval is the foundation (request+access rights and permission feedback loop), and where no interaction is possible until mutually confirmed, ensures that relationships start and evolve in a way that both sides are comfortable with. Additionally, the potential asymmetry within relationships remains between a person and any non-person Entity, and the same rights and freedoms will mutually apply. A unique non-person Entity is assigned a & handle (or other unique identifying access key ID) with the same capabilities as any & handle representing a person. This unique identity will have individual relationships with the people who choose to relate with it at any level besides "blocked".

Returning to FIG. 1, in some instances as mentioned above, the IAR 28 originates from a requesting entity that is not registered within the system 20 (e.g., the Requesting Non-System Entity Proxy (or "RNSEP") 26). A RNSEP could be a person or a script, piece of code, bot, and any other method obvious to someone of ordinary skill. The & handle (or other unique identifying access key ID) of the DEP 24 to which the RNSEP 26 is sending the IAR 28 will still apply the DEP's 24 access rights and permissions rules. These rules are under the sole discretion of the Entity that established the DEP 24, including broad access to no access at all—as if the RNSEP 26 had never attempted to send an IAR at all. For example, a search engine may have an indexing bot, an RNSEP, which sends an IAR to a DEP. The DEP then applies the rules of its entity to decide what information, if any, to provide back to the bot.

Figure 6:
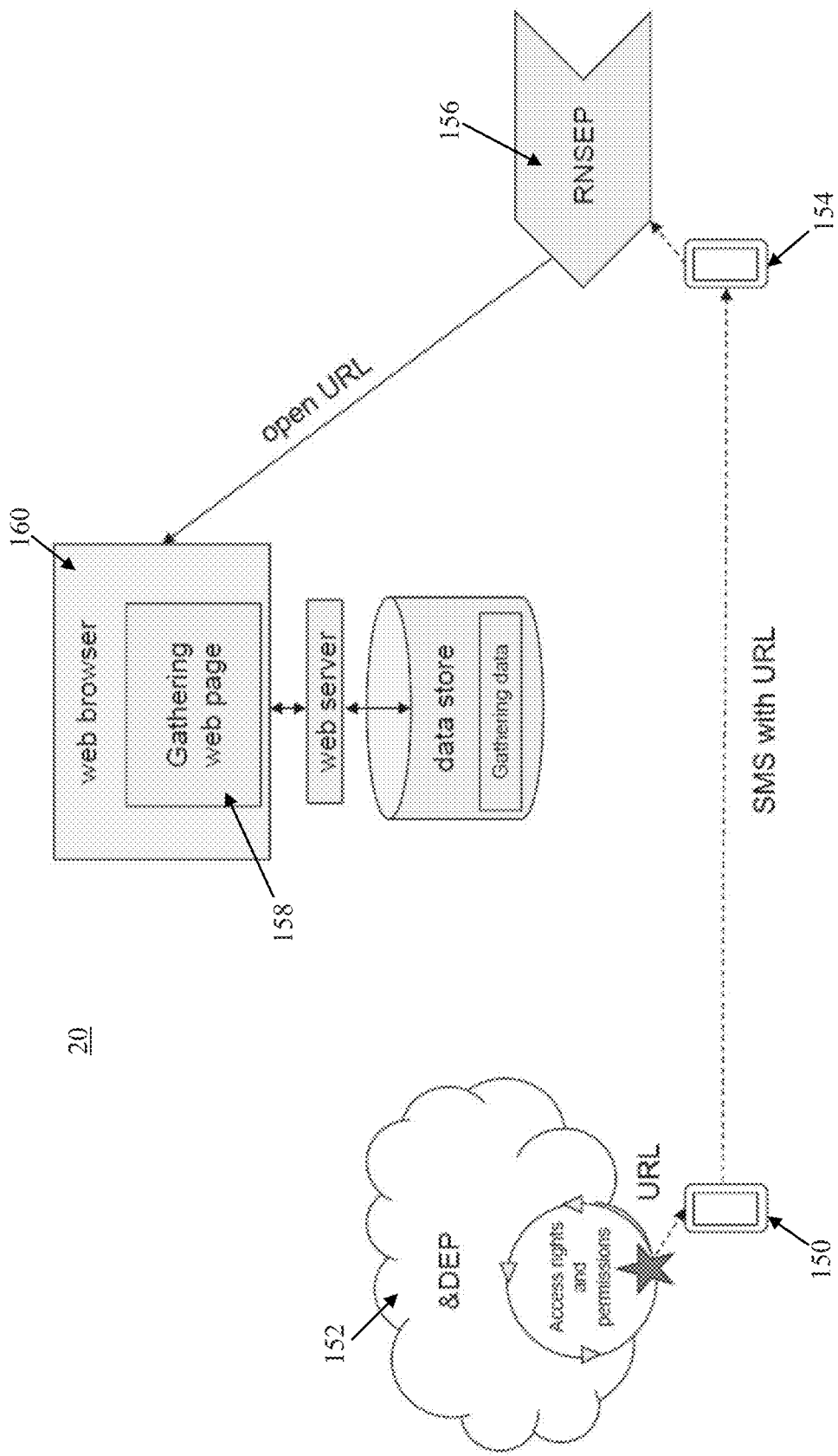
FIG. 6 is an illustrative block diagram of a network system of the present disclosure, and depicts methods of facilitating interactions between entities connected to the system in accordance with principles of the present disclosure such as a first entity inviting a second entity to a web page of the first entity.

In certain embodiments, an RNSEP can engage with the system 20 via an invitation to a gathering of at least one Entity established within the system 20 (e.g., the DEP 24). By way of example, an Entity "&Josephine" wants to plan a coffee meeting with potential new hire Belal. Belal does not have an established entity proxy in the system 20 or has not shared it with &Josephine. She can still create an event within the system 20 and connect to Belal through her &Josephine handle. The system 20 creates a URL for the gathering web page that Belal can link to for temporary access to the system 20, &Josephine's handle and her defined rights and permissions around the meeting. FIG. 6 further illustrates the optional feature of the systems and methods of the present disclosure. A first Entity operating a device 150 has an established system proxy ("&DEP") 152. The first Entity creates an event and connects to a device 154 operated by a second entity ("RNSEP") 156 that does not have an established entity proxy in the system 20 or has not shared it with the first Entity. In response to this action, the system 20 automatically creates a URL for a gathering web page 158 that can be accessed by the second entity 156 via a web browser 160.

Returning to FIG. 1, in some embodiments, the systems and methods of the present disclosure are configured such that Entities are able to share media across relationships. Media can include, but is not limited to, contact information, notes, video clips, audio files, internet links, photos, etc. Media can originate from an experience or moment outside the physical parameters as well as what is created when Entities are within physical parameter of each other as described above.

Media can also include potential elements that act as vehicle to connect and build relationships. For example, Entity Terrance can assign a topic of "baseball" to other specific Entities that he believes are interested in baseball—whether they already are in relationships with each other or not. The system 20 can be programmed or configured such that when two (or more) of those other Entities enter into each other's physical proximity (e.g., within the proximity limit), and have set their accessibility rights to include at least one of the other Entities tagged by Terrance, they will be notified that another Entity, known by Terrance and labeled interested in baseball, is nearby.

Within and via the system 20, direct introductions can be made to entities without needing to share information beyond their & handle (or other unique identifying access key ID). For example, Jack knows Jill and Jose, although they have not been introduced. Jack can introduce both through the system 20, establishing a connection between their & handles. The two can then decide what access rights the other can have, including no access permissions at all. If both allow the other notifications of physical location when in close proximity, Jill and Jose can choose to meet face to face when they are nearby. In some embodiments, the systems and methods of the preset disclosure will provide Jack with the option to include suggested topics to discuss.

With some systems and methods of the present disclosure, introductions can also be made between an Entity with a & handle (or other unique identifying access key ID establishing a proxy within the system 20) and an entity without a & handle. For example, Maria can connect her neighbor Calvin to the Japanese restaurant he was asking about. The Japanese restaurant has a phone number that Calvin can now call via his & handle while also establishing access permissions for the restaurant to call him back to confirm a reservation.

Unique identifying access keys (e.g., & handle) are the vehicle for 'Evergreen' contacts. E.g., if an Entity's phone number or email change, that information will be automatically updated within the system 20. Entities may be asked to confirm their own possibly modified contact information if the system 20 observes multiple connections editing profile notes for said entity. For example, if Entity Sarah's five closest friends have all noted that she has a new email or has moved to a new city, the system 20 can be configured to ask Sarah to confirm this change of information in her own personal profile. That confirmed, updated information will then be available to all of Sarah's relationships whom she has granted access rights regarding this particular contact information. By further explanation, Entity Sarah's work contact email may have changed, and therefore those who she has approved to contact her for professional reasons will now contact her through this updated work email. For those who she has not granted professional access rights, they will not receive any notification at all as they were never granted work email rights in some embodiments.

Beyond communication accessibility, what other Entities can access about one another are details including, but not limited to, basic profile information and available "next steps" for interactions.

By way of example, to help with relationship building and easing the process of gathering in person, personal information, including but not limited to name, location, and ability to chat can be associated with different levels of relationships. In terms of person-to-person relationships, close friends and family may be able to see more details (e.g., when an Entity is in their 'home' location) while another Entity defined as 'human' will only be able to see basic demographics like name and gender.

For example, the types of relationships can be visualized by using a sliding scale on the platform which covers most to least access rights from the perspective of the REP as defined by the DEP. In this sense, some of the systems and methods of the present disclosure mimic and amplify an Entity's current social desire through a dimmer switch of accessibility. As presented to the Entity for selection, different colors can correspond to varying 'rights and freedoms' and the Entity's desired accessibility by other entities. For example:

a) DEP is least accessible, REP has to have the most access permissions to connect (such as close family, inner circle of friends, most trusted organizations and teams);
b) DEP is most accessible, REP needs fewer access permissions to connect (such as strangers, unfamiliar organizations);
c) DEPs can also label certain REPs as "avoid" such that when in physical proximity, the system 20 will not notify the DEP that an REP labeled "avoid" is nearby and/or may nudge the DEP to another location, or when planning activities, the system 20 may not suggest a location where the "avoid" REP is currently located;
d) DEPs can also block specific REPs so that the REP never has access to the DEP via the system 20;
e) DEPs can also choose complete "invisibility", for example, by turning off accessibility to all other entities.

By way of example, when engaging the system 20 to view what other & handle Entities are in physical proximity, a DEP accessibility level set to Friends and stronger relationships (i.e., more access rights) will only be visible to and see entities with these associated rights (such as "Friends" or "Inner Circle"). If this Entity had their accessibility set to Human, they would see and be visible to all Entities within their proximity not defined as "Avoid" or "Blocked".

By way of further example, if an entity has physical location access preferences set accessible to at least one other entity, the system 20 will send a request to all DEPs that this accessibility preference applies to within physical proximity limits set by the entity or the system 20. If and when an approved DEP appears within physical proximity limits, the DEP's & will receive an IAR from the REP requesting accessibility preferences. In the request from the REP are included accessibility preferences of the REP (such as physical location and ability to contact). If the DEP also allows for physical location visibility, both the REP and DEP will be notified of each other's location.

By way of further example, if Mary defines her siblings, parents and spouse as "Inner Circle," Mary will always be accessible to these specific entities when she is in their proximity limits. However, because Mary defines her dentist Jessica as an "Acquaintance," Jessica will only appear accessible when Jessica is within Mary's spotlight and when Mary has specifically chosen to be accessible to those with this level of accessibility and greater (e.g., such as relationships defined by Acquaintances, Associates, Friends, and Inner Circle).

By way of further example, if Harry feels like he has a 'friend' relationship with Steve, but in Steve's perception, he's more comfortable with Harry having access to him only as an "acquaintance", Harry will be allowing 'friend-level' accessibility to Steve, while Steve will only be permitting to Harry what he feels comfortable acquaintances accessing. As in real life, System-supported relationship dynamics can evolve. If at any point Harry or Steve feels like they want their relationship status to change (from acquaintance to associate after a company partnership, for example) they can edit the level in the application. Also, as in real life, relationship descriptions may not manifest the same for all types of people, organizations or teams that could be generally described that way. Entities with a & handle are always equipped to modify access rights and permissions on an individual level—per REP, per accessing instance if they so choose.

In some embodiments, a unique & and associated access rights and permissions are associated with a unique entity that is not a person. Non-person entities can include businesses, organizations, coalitions, and groups of people (i.e. "Teams"). As with person to person interaction, non-person entities can employ their & handle and access preferences to other non-person entities, as in a business to business relationship. Non-person entities can also interact via the system 20 with people.

By way of example, business Moonbucks claims a unique &Moonbucks to represent their entire business. This access key then informs how it communicates via the system 20 with any other person or non-person &. For example, &Moonbucks works with vendor &CupsToday. This vendor is contracted to deliver one hundred cups a day to each store. &Moonbucks therefore determines that when &CupsToday sends an IAR concerning delivery time estimates, &Moonbucks access preferences allow the store manager's desk phone to be accessed. &Moonbucks' other vendor, &MusicMaven, who periodically sells play rights for new hits, is only allowed access to the shared barista iPad, as the baristas are the ones in charge of planning the daily playlist.

By way of further example, when Mohammed goes into &Moonbucks for a latte, Mohammed's & and access preferences activate his usual order—soy latte. Mohammed has allowed &Moonbucks OTA technology to scan for his & and related access preferences, including regular orders, credit card, and loyalty program information. In some embodiments, Mohammed's friend, Ron, may get a notification through his own Moonbucks loyalty program asking if he would like to connect via his &, therefore enabling similar service capabilities as allowed by Mohammed. Ron can decide if he wants any or all of the same types information that &Moonbucks access regarding &Mohammed. All entities involved can modify or completely cancel access to each other at any time.

Figure 7:
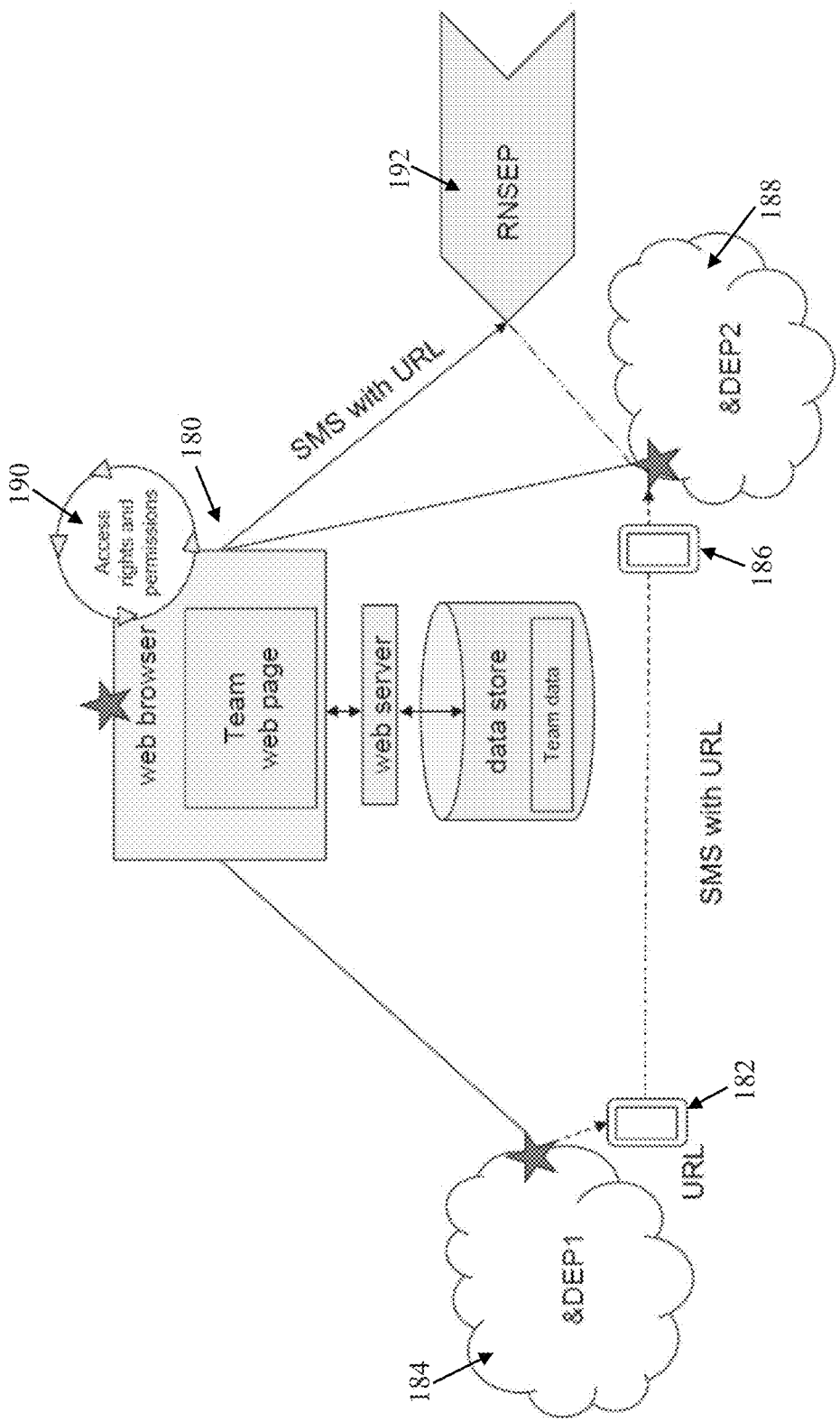
FIG. 7 is an illustrative block diagram of a network system of the present disclosure, and depicts methods of facilitating interactions between entities connected to the system in accordance with principles of the present disclosure such as creating of a Team Entity.

Groups of people, of people and non-people can connect together via the System such that a new entity forms, representing the group that has combined as represented by FIG. 7. This group, in some embodiments called a "Team", can claim its own & handle (or other unique identifying access key ID) and interact with individual entities or other Teams as an individual would interact with another individual, with an & handle that acts as an access key to the group's determined rights and permissions. With the non-limiting example of FIG. 7, a Team 180 is created that encompasses multiple Entities, including a first Entity using an electronic device 182 to operate a first Entity proxy 184 ("&DEP1") within the system 20 ("&DEP1") and a second Entity using an electronic device 186 to operate a second Entity proxy 188 ("&DEP2") within the system 20. The Team 180, once created, also has assigned to it a unique identifying access key ID (e.g., & handle) with corresponding access rights and preferences 190. This identifying access key ID manages the access rights and preferences of the Team itself as if it were a singular entity. Where desired, members of the Team 180 can electronically connect others entities to a web page of the Team (via, for example, a corresponding web browser), such as entity "RNSEP" 192, for mutual involvement in the Team.

By way of example, individuals Leandra, Ariya, Jason and Xochitl, the coalition Homes4All and non-profit Safe Beds all join together to form a Team &Homeful to collaborate around supporting affordable housing initiatives in their community. &Homeful may interact with grantors, construction companies and other interested individuals employing the same method of access and access preferences as any REP and DEP as previously described.

Within Teams, access rights and permissions may be applied to entities associated with the team such that individual entities who may not have been connected before, now that they are part of the same team, may have access rights to one another. Within teams, access rights can vary per entity and, as in previous descriptions, always under final control of the DEP.

In some embodiments, the systems and methods of the present disclosure are programmed or configured such that an entity's accessibility preferences evolve based on factors such as time, location or through machine learning so that a particular Entity does not need to continuously modify visibility and accessibility based on current preferences. For example, an Entity may choose to make themselves more open and accessible on the weekends or after work, and less accessible when they are engaged in a specific activity like grocery shopping.

The network system's 20 "knowledge" of an Entity via their & handle and behavioral preferences can also impact other kinds of activity in the proximity parameter that then influences a given Entity's experience in some embodiments. An example activity could include payment, such as payment by presence. Depending on where an Entity is, and their relationship with another entity (including but not limited to another person, business, or brand) a payment can be transmitted through a variety of channels and currencies such as credit card, bank account, or bitcoin. Another example activity may result in an Entity's ability to influence the action and response of a distinct 'enabled' device. An example is an Entity's physical presence near a television or other media-viewing device, which then begins to enable media-accessing rights by the viewing Entity, such as Netflix or HBO Go. Another example could include a hotel bellhop who meets Entity Greg in the lobby, greets Greg by name and through Greg's relationship with the hotel, will know what kind of customer service he prefers.

Figure 8:
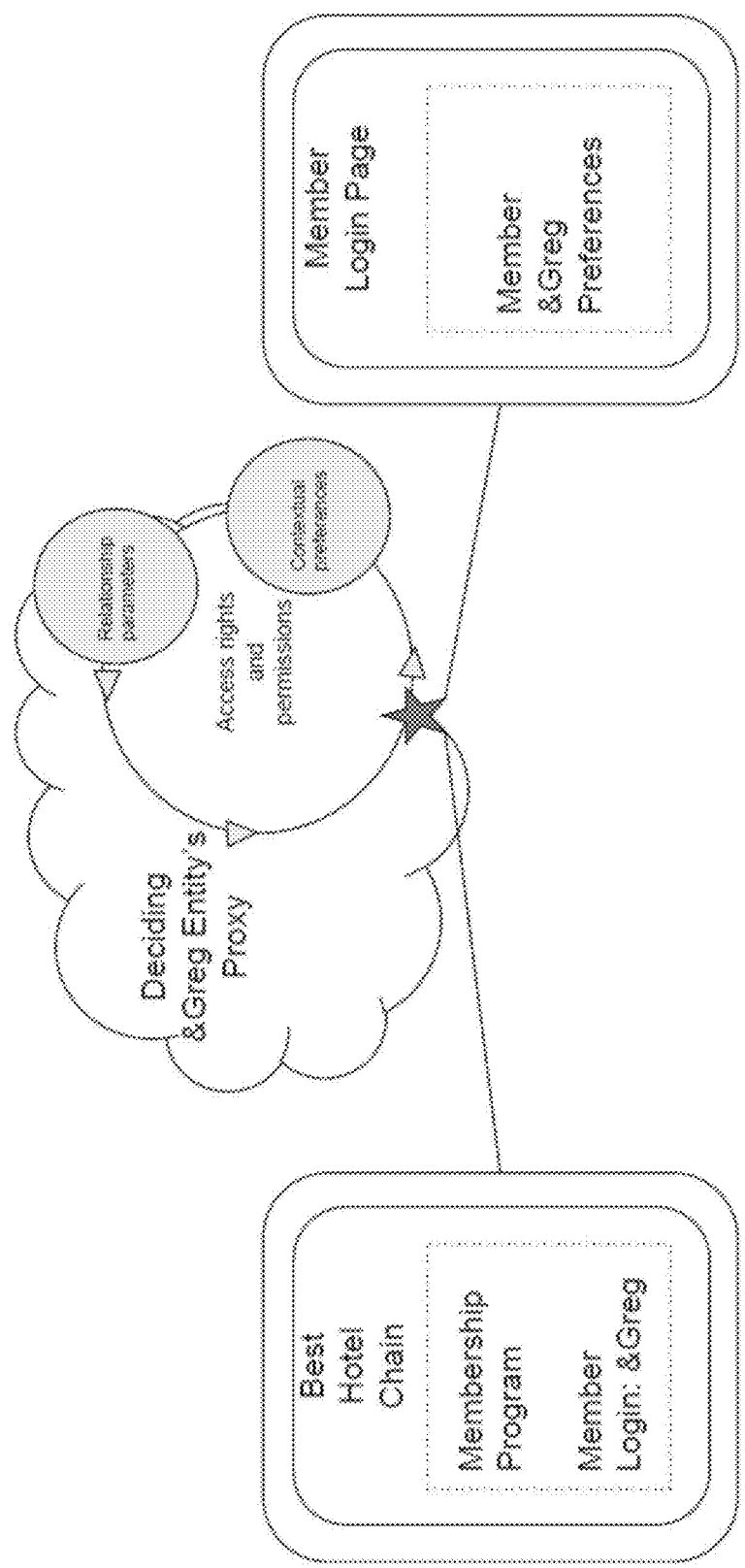
FIG. 8 is an illustrative block diagram of a network system of the present disclosure, and depicts methods of facilitating interactions between entities connected to the system in accordance with principles of the present disclosure such as a first entity interacting with a second entity via an SDK arrangement.

A hotel bellhop is able to know Greg's preferences and relationship with the hotel via the capability for businesses (i.e., the hotel chain where he works) to incorporate the System, including some or all of the functionality described above, into another application environment, for example, an SDK (software development kit). For example, a brand that has previously established a membership program with customers can integrate the system 20 to leverage the above mentioned-functionalities as represented by FIG. 8.

The present disclosure provides a marked improvement over previous designs. In contrast to the current operation of digital platforms that require the individual to create a login and password to gain access to a service, their own personal profile, experience, etc., some embodiments of the present disclosure provide entities (person, organization, group of people and/or organizations) with a process of their own that will act on queries from outside sources—including the very platforms that currently require individual logins. Unlike current digital platforms in which information about individuals and organizations accumulates most often without those sources engaged in the process, some embodiments of the present disclosure provide opportunities for the information source to view and control these instances of attempted access and of their information. Unlike current systems in which in order to engage with a platform, service, company and network, entities are often required to provide personal information and accept the terms of service, including privacy and data management policy of the provider, some embodiments of the present disclosure implement a method by which the entity itself presents a terms of service that the platform, service, company and networks must agree to in order to access the entity's information and engagement. Along these same lines, unlike current networking system where the sender of information chooses the method by which the data is sent, some embodiments of the present disclosure empower the receiver of information the ability to contextually and dynamically choose how information is sent.

Although the present disclosure has been described with reference to preferred embodiments, workers skilled in the art will recognize that changes can be made in form and detail without departing from the spirit and scope of the present disclosure.

The invention claimed is:

1. A method of facilitating interactions across a network system, the method comprising:
   establishing a Deciding Entity's Proxy ("DEP") within the network system for a Deciding Entity, the DEP including a unique identifying access key ID;
   generating an information access request (IAR) within the network from a Requesting Entity to the DEP by a Requesting Entity's Proxy ("REP") established within the system;
   delivering the IAR to the DEP via the unique identifying access key ID associated with the DEP, wherein the DEP is operating on an electronic device under control of the Deciding Entity such that the step of delivering includes the IAR being received at the electronic device;

determining by the DEP, as operating on the electronic device under the control of the Deciding Entity, whether to grant or deny the IAR based upon a review of rules assigned to the DEP;

and returning the information responsive to the IAR to the REP via the network only if the IAR is determined to be granted.

2. The method of claim 1, wherein the unique identifying access key ID includes an alpha-numeric string beginning with the symbol "&", and further wherein following the "&" symbol, each combination of characters will be unique among all Entities within the network.

3. The method of claim 1, wherein the unique identifying access key ID is not indefinitely tied to any other identifier associated with the assigned Entity.

4. The method of claim 1, wherein the unique identifying access key ID accesses DEP-related information residing within and outside the network system.

5. The method of claim 1, wherein the unique identifying access key ID is electronically linked to instructions for preferred types of access and relationships with other unique identifying access key IDs associated with REPs which are unique nodes within the network system.

6. The method of claim 1, wherein the unique identifying access key ID carries instructions for preferred types of access and relationships with REPs sending information access requests from outside the network system.

7. The method of claim 1, wherein the unique identifying access key ID and corresponding linked rules facilitates asymmetric relationships in which access rights and permissions are not equally shared by both the DEP and REP, including the REP having a unique identifying access key ID and rules assigned to the REP, and further wherein the step of generating an IAR includes providing information of the REP to the DEP in accordance with the rules assigned to the REP.

8. The method of claim 1, wherein the unique identifying access key ID belonging to the DEP instructs permissible information access by the REP.

9. The method of claim 1, wherein the DEP determines access rights and permissions for all REP requests, including internet search and browser-based requests for access.

10. The method of claim 1, wherein the unique identifying access key ID, rights and preferences are assigned to at least one of a person, a non-person, a multi-person, and a multi-non-person entity.

11. The method of claim 1, wherein the unique identifying access key ID represents a multitude of entities who have connected such that the singular grouping of these entities creates a new, unique DEP, and thus controls a unique identifying access key with corresponding access rights and permissions as if it were a singular entity.

12. The method of claim 1, wherein the unique identifying access key ID obstructs an REP from accessing the Entity associated with the DEP if access rights have not been granted.

13. The method of claim 1, wherein the unique identifying access key ID will facilitate interactions within the network system as well as third party platforms.

14. The method of claim 1, wherein the unique identifying access key ID will facilitate interactions within the network system as well as when embedded in other applications and software development kits (SDK).

15. The method of claim 1, wherein the unique identifying access key ID instigates payment-by-presence processes as informed by access rights and permissions.

16. The method of claim 1, wherein the unique identifying access key ID instigates identification processes in physical proximity to an REP as informed by access rights and permissions.

17. The method of claim 1, wherein the unique identifying access key ID instigates external device activation processes as informed by access rights and permissions.

18. The method of claim 1, wherein access preferences evolve contextually based on at least one factor selected from the group consisting of time, place, and preference.

19. The method of claim 1, wherein access preferences apply to at least one contextual activity selected from the group consisting of meetings, events, and gatherings.

20. The method of claim 1, wherein access preferences evolve contextually as informed by machine learning.

21. The method of claim 1, wherein access preferences allow entities to update contact information of other approved entities such that constantly updated contact information is confirmed within and pushed out by the system to approved entities.

22. The method of claim 1, wherein the step of delivering the IAR to the DEP is characterized by the IAR not passing through a central server.

* * * * *